United States Patent
Forster

(10) Patent No.: US 11,664,577 B2
(45) Date of Patent: May 30, 2023

(54) SYSTEM AND METHOD FOR RADIO FREQUENCY IDENTIFICATION TAG REUSE

(71) Applicant: AVERY DENNISON RETAIL INFORMATION SERVICES, LLC, Mentor, OH (US)

(72) Inventor: Ian J. Forster, Chelmsford (GB)

(73) Assignee: Avery Dennison Retail Information Services LLC, Mentor, OH (US)

(*) Notice: Subject to any disclaimer, the term of this patent is extended or adjusted under 35 U.S.C. 154(b) by 0 days.

(21) Appl. No.: 16/654,171

(22) Filed: Oct. 16, 2019

(65) Prior Publication Data

US 2020/0119428 A1 Apr. 16, 2020

Related U.S. Application Data

(60) Provisional application No. 62/746,260, filed on Oct. 16, 2018.

(51) Int. Cl.
*H04W 4/80* (2018.01)
*H01Q 1/22* (2006.01)
(Continued)

(52) U.S. Cl.
CPC ....... *H01Q 1/2216* (2013.01); *G06K 7/10386* (2013.01); *G06K 19/07758* (2013.01);
(Continued)

(58) Field of Classification Search
CPC ..... H01Q 1/2216; H01Q 1/2225; H04W 4/80; G06K 7/10386; G06K 19/07758; G06K 19/07749; G06K 19/00; G06K 19/06; G06K 19/067; G06K 19/07; G06K 19/077; G06K 19/0776; G06K 19/07762; G06K 19/07764; G06K 19/07771; G09F 3/0297; H04B 5/02
See application file for complete search history.

(56) References Cited

U.S. PATENT DOCUMENTS 6,281,795 B1 8/2001 Smith et al.
6,836,215 B1 12/2004 Laurash et al.
(Continued)

OTHER PUBLICATIONS

International Search Report and Written Opinion dated Dec. 17, 2019 issued in corresponding IA No. PCT/US2019/056431 filed Oct. 16, 2019.
(Continued)

*Primary Examiner* — Amine Benlagsir
*Assistant Examiner* — Anthony D Afrifa-Kyei

(57) ABSTRACT

A label includes a recycled sloop type radio frequency identification (RFID) tag from a previously used label. The RFID tag is removed from the previous label by cutting the RFID tag from the previous label using a laser, die, or cutting wheel. The conductor antenna of the RFID tag can be cut to remove damaged portions or change operation of the RFID tag. A slot in the conductor antenna can be resized to tune the RFID tag to allow the RFID tag to be used for the same application use or a different application use. The label can include indicia such as machine readable indicia and human readable indicia. The extracted RFID tag can include portions of the previous label, which can be free of indicia.

17 Claims, 5 Drawing Sheets

(51) Int. Cl.
*G06K 7/10* (2006.01)
*G06K 19/077* (2006.01)
*G09F 3/00* (2006.01)

(52) U.S. Cl.
CPC ......... *G09F 3/0297* (2013.01); *H01Q 1/2225* (2013.01); *H04W 4/80* (2018.02)

(56) References Cited

U.S. PATENT DOCUMENTS

| | | | | |
|---|---|---|---|---|
| 2003/0136503 | A1* | 7/2003 | Green | G06K 19/07745 |
| | | | | 156/264 |
| 2004/0233065 | A1* | 11/2004 | Freeman | G06K 17/00 |
| | | | | 340/8.1 |
| 2006/0080819 | A1* | 4/2006 | McAllister | G06K 17/00 |
| | | | | 29/403.3 |
| 2006/0232413 | A1* | 10/2006 | Lam | G06K 19/06018 |
| | | | | 340/572.1 |
| 2007/0126589 | A1 | 6/2007 | Jacober et al. | |
| 2007/0152829 | A1 | 7/2007 | Lindsay et al. | |
| 2009/0002125 | A1* | 1/2009 | Yamaguchi | G06K 19/07718 |
| | | | | 340/5.1 |
| 2011/0133904 | A1* | 6/2011 | Warther | G06K 19/14 |
| | | | | 340/10.5 |
| 2017/0068930 | A1* | 3/2017 | Attar | G06K 19/07758 |

OTHER PUBLICATIONS

International Preliminary Report on Patentability dated Apr. 14, 2021 issued in corresponding IA No. PCT/US2019/056431 filed Oct. 16, 2 019.

* cited by examiner

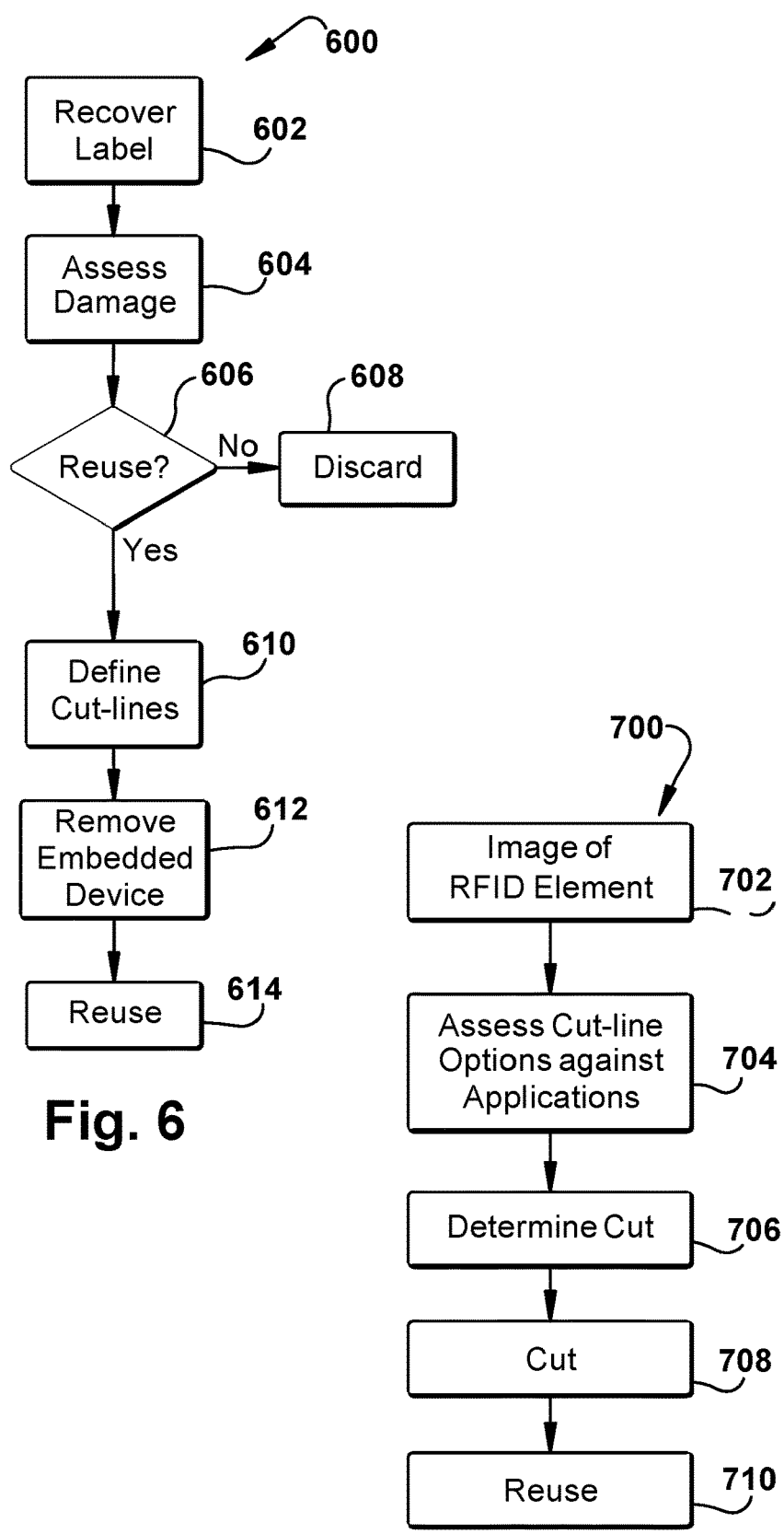
Fig. 6
Fig. 7
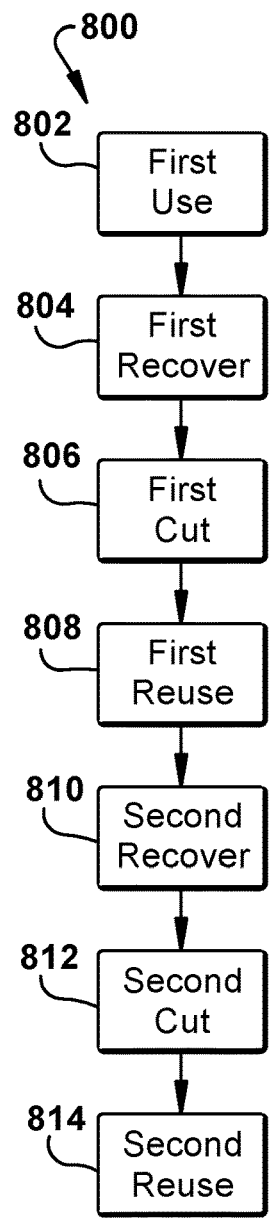
Fig. 8

SYSTEM AND METHOD FOR RADIO FREQUENCY IDENTIFICATION TAG REUSE

CROSS REFERENCE TO RELATED APPLICATION(S)

The present application claims priority to and the benefit of United States provisional patent application No. 62/746,260 filed Oct. 16, 2018, which is incorporated herein by reference in its entirety.

TECHNICAL FIELD

The subject application generally relates to reusing radio frequency identification ("RFID") tags and, more specifically, to systems and method for removing an RFID tag from a first label for use in a second label.

BACKGROUND

Radio Frequency Identification ("RFID") systems operate using radio frequencies such as ultra-high frequency ("UHF") radio waves operating between 860 MHz to 960 MHz. RFID transponders, such as RFID tags, typically include an antenna and/or tuning loop coupled to an RFID chip. The RFID chip receives power when excited by a nearby electromagnetic field oscillating at the resonant frequency of the RFID transponder, such as when an RFID reader interrogates the RFID tag. Once the RFID chip has received sufficient power, (e.g., such as 10 µW), the RFID chip turns on and sends a coded return signal via the antenna or tuning loop. An RFID reader interrogating the RFID tag receives and decodes the coded return signal from the RFID transponder.

RFID tags enable the tracking of items by RFID systems. Many RFID tags are embedded in a label, placed on an individual item for tracking or inventory control of that item, and eventually discarded once those operations are completed. For example, a baggage tag for luggage in the airline industry may include an RFID tag to facilitate tracking luggage during transit through airline facilities, after which the baggage tag remains on the luggage and is eventually disposed of by the customer. As the popularity of RFID tags grows, this single use paradigm will lead to an increasing amount of waste.

SUMMARY

According to certain embodiments, a method includes determining an undamaged portion of a conductor antenna of a radio frequency identification ("RFID") tag associated with a first label, determining cut lines to remove, from the first label, part of the RFID tag that includes only undamaged portions of the conductor antenna, and placing the removed RFID tag in a second label. The cut lines can be used to resize or reconfigure the conductor antenna for a different operational mode in the second label.

In certain other embodiments, a method includes extracting a radio frequency identification ("RFID") tag from a first label and placing the extracted RFID tag into a second label. Extracting the RFID tag can include cutting a perimeter around the RFID tag in the first label to release the RFID tag, or determining undamaged portions of the conductor antenna in the first label and cutting the RFID tag such that only undamaged portions of the conductor antenna are used by the extracted RFID tag in the second label.

According to yet other embodiments, a label includes a substrate having a plurality of indicia and a radio frequency identification ("RFID") tag removed from a second label and secured to the substrate. The RFID tag includes at least a portion of the conductor antenna from the second label, a slot disposed between opposing sides of the conductor antenna, and an RFID chip disposed across the slot and electrically connected to the opposing sides of the conductor antenna. The portion of the conductor antenna and the slot can be resized and configured to support different application uses in the label than the second label.

BRIEF DESCRIPTION OF THE DRAWINGS

Various embodiments will become better understood with regard to the following description, appended claims, and accompanying drawings.

FIG. 6 is a flowchart of example operations for recovering an RFID tag from a label.

FIG. 7 is a flowchart of example operations for determining reuse options of a damaged RFID tag.

FIG. 8 is a flowchart of example operations of multiple reuses for a recovered RFID tag.

DETAILED DESCRIPTION

The systems and methods disclosed herein are described in detail by way of examples and with reference to FIGS. 1 to 11. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

The systems and methods disclosed herein describe new modalities for recycling used RFID tags, namely recovering RFID tags by removing an RFID chip and antenna from a label previously associated with an item of commerce, luggage, or other item. The removed RFID tag can then be reused for the same application or repurposed for a new use. Although the systems and methods described herein are particularly applicable to RFID systems and transponders, the structures and methodologies can be adapted for use with other types of wireless tags, for example those used in Electronic Article Surveillance ("EAS") systems.

Figure 1:
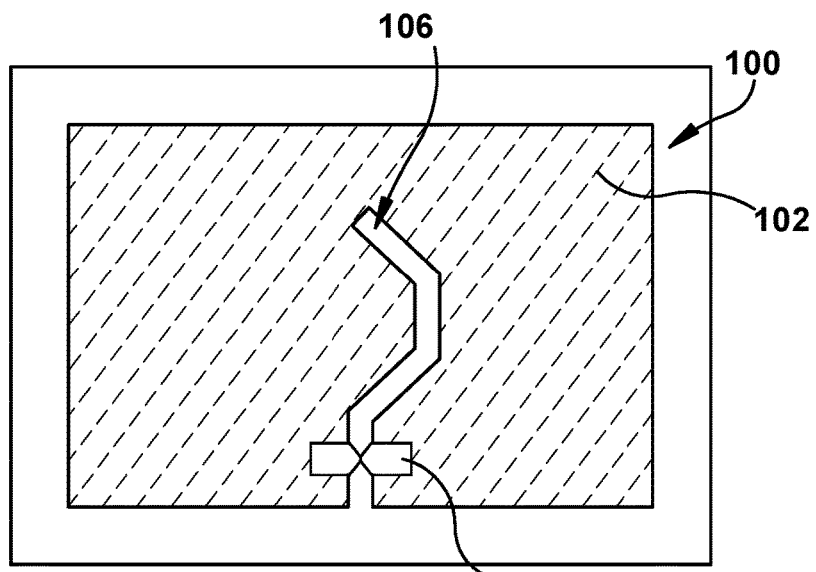
FIG. 1 depicts an RFID tag with a sloop type antenna according to one embodiment.

Referring to FIG. 1, an embodiment of a sloop type RFID tag 100 is presented. A sloop type RFID tag 100 includes a conductor 102 that has an aperture or slot 106 formed in the conductor 102. An RFID chip 104 or strap is disposed across the slot 106 and electrically connected to different sides of the conductor 102, which functions as the antenna of the sloop type RFID tag 100. The operational frequency and performance of the sloop type RFID tag 100 is proportional to the dimensions of the conductor 102 and the length and geometry of the slot 106. The sloop type RFID tag 100 can be tuned by making changes to the slot 106 or the dimensions of the conductor 102.

Figure 2:
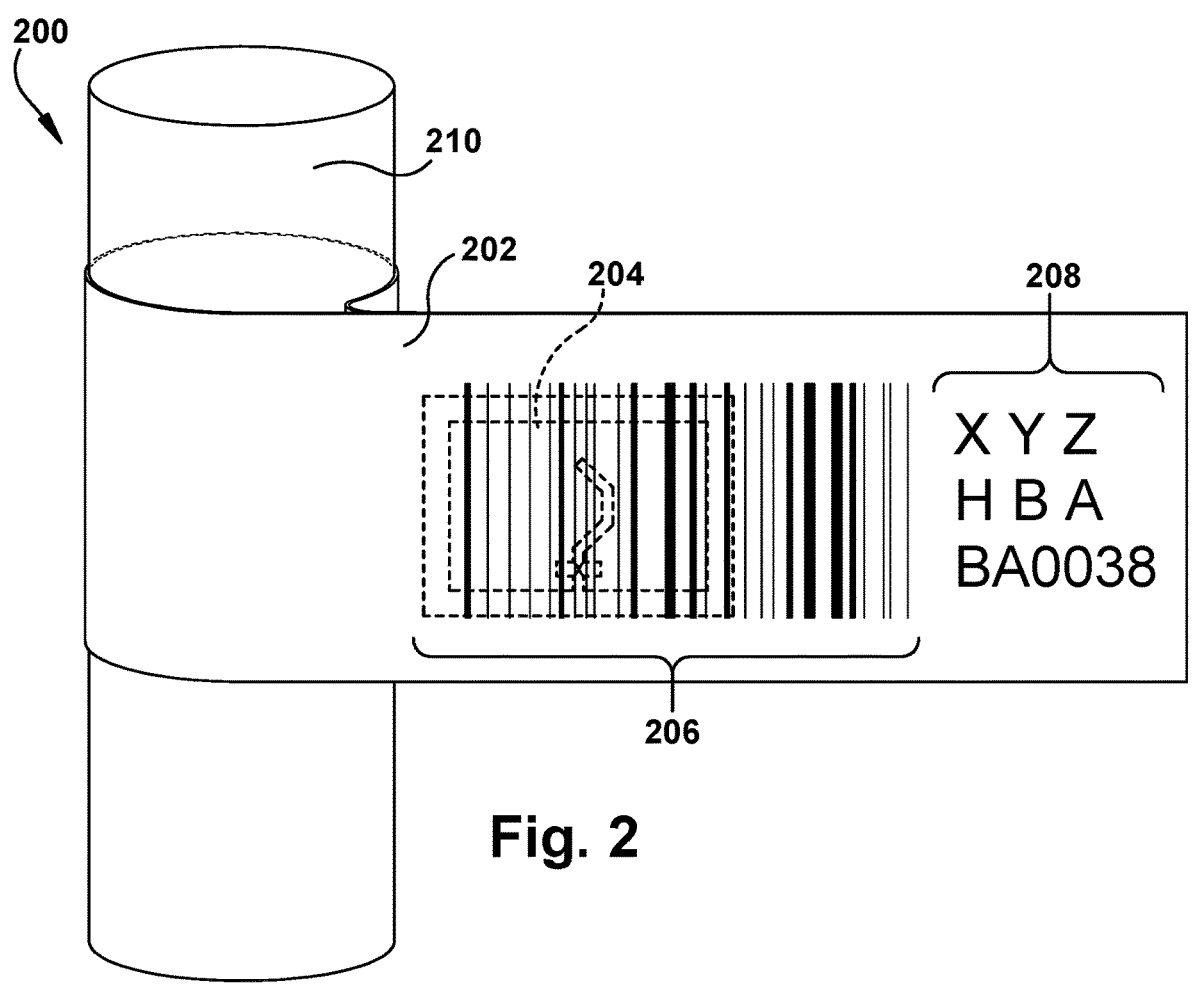
FIG. 2 depicts a baggage label with an RFID tag according to one embodiment.

Referring to FIG. 2, an embodiment of an RFID baggage tag 200 is presented. The RFID baggage tag 200 includes a baggage label 202 that can be wrapped around a baggage handle 210 or otherwise affixed or secured to baggage as would be understood in the art. RFID baggage tag 200 also includes a sloop type RFID tag 204 that is secured to, or in, the baggage label 202. The baggage label 202 can include indicia such as human readable indicia 208 such the owner's name and travel destination and machine readable indicia 206 such as a barcode.

Figure 3:
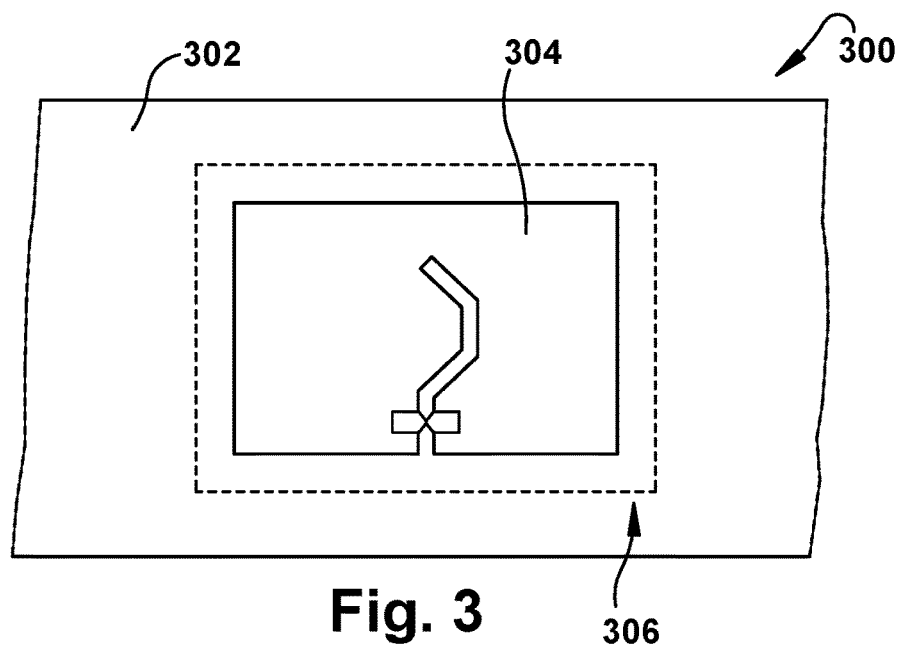
FIG. 3 depicts a recovered RFID tag according to one embodiment.

Referring to FIG. 3, an embodiment of a recovered RFID tag 300 is presented. An RFID tag 304 is removed from a previously used label 302, such as the RFID baggage tag 200 of FIG. 2, by cutting a path 306 around the RFID tag 304 and removing the RFID tag 304 from the label 302. For example, if the RFID tag 304 was embedded in a label 302 such as the RFID baggage tag 200 of FIG. 2, then cutting a path 306 around the perimeter of the RFID tag 304 would release the RFID tag 304 from the label 302. Cutting a path 306 in the label 302 to recover the RFID tag 304 can be performed mechanically, for example using a knife cutter or die cutter. The path 306 can also be cut using a laser cutting system, which can be guided using a suitable camera system as would be understood in the art. Laser cutting systems advantageously increase the speed and flexibility of cutting a path 306 in the label. In a configuration, a laser system can pre-distort the cut path 306 to accommodate labels 302 that are creased, or otherwise not flat.

Figure 4:
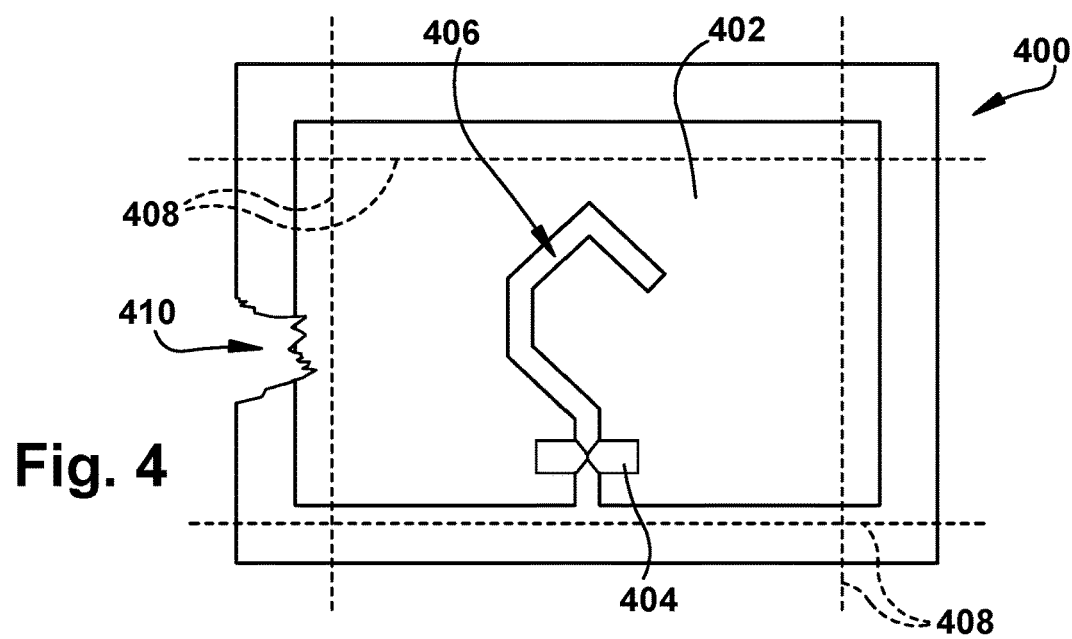
FIG. 4 depicts a damaged RFID tag according to one embodiment.
Figure 11:
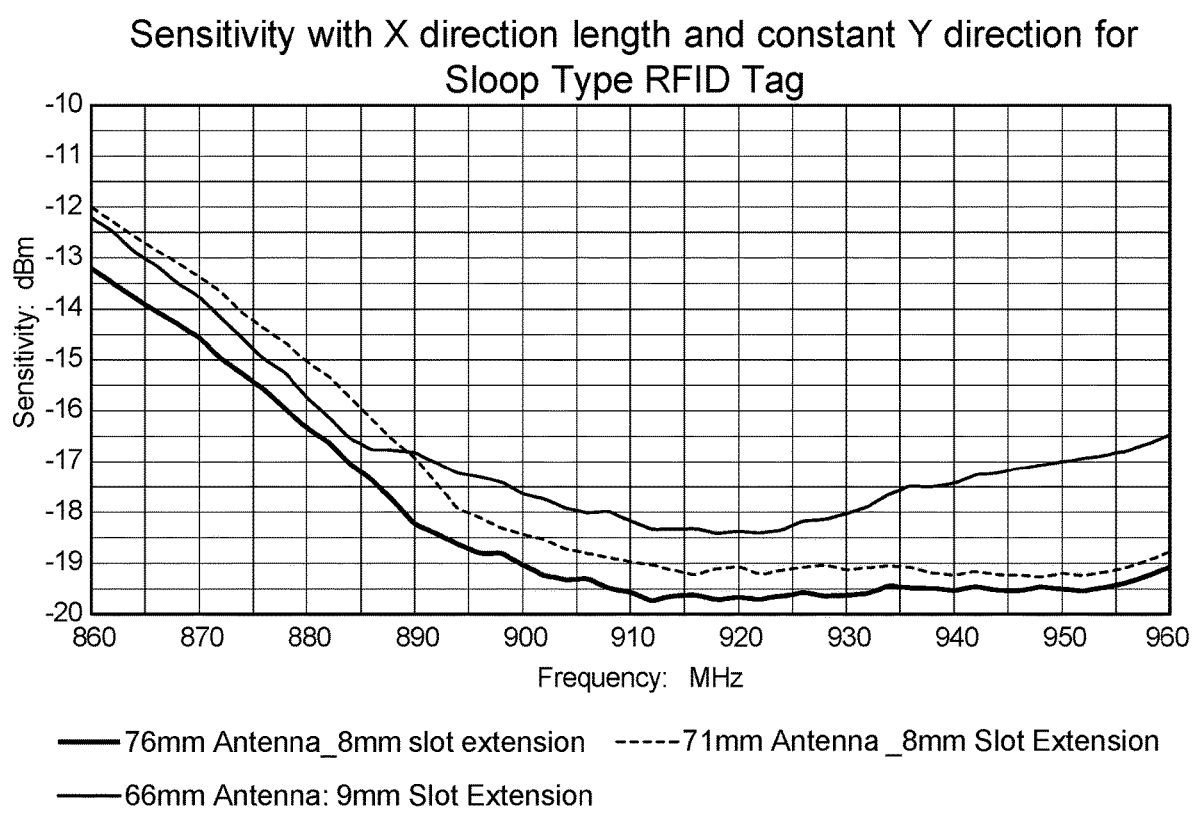
FIG. 11 is a graph of sensitivity for sloop type RFID tags.

Referring to FIG. 4, an embodiment of a damaged RFID tag 400 is presented. Cut lines 408 can be configured to remove the RFID chip 404, the slot 406, and a portion of the conductor 402 from the damaged RFID tag 400. The cut lines 408 can isolate a damaged area 410 from the damaged RFID tag 400. In an alternative embodiment, the cut lines 408 can be used to reconfigure a non-damaged RFID tag 400, for example by removing conductor 402 to change the overall size of the RFID tag, or the performance of the RFID tag to reconfigure the RFID tag for a different purpose or application. Referring also to FIG. 11, a graph of the sensitivity for sloop type RFID tags is presented. The graph illustrates that changes to the dimensions of the conductor 402 can be used to tune the RFID tag.

Figure 5:
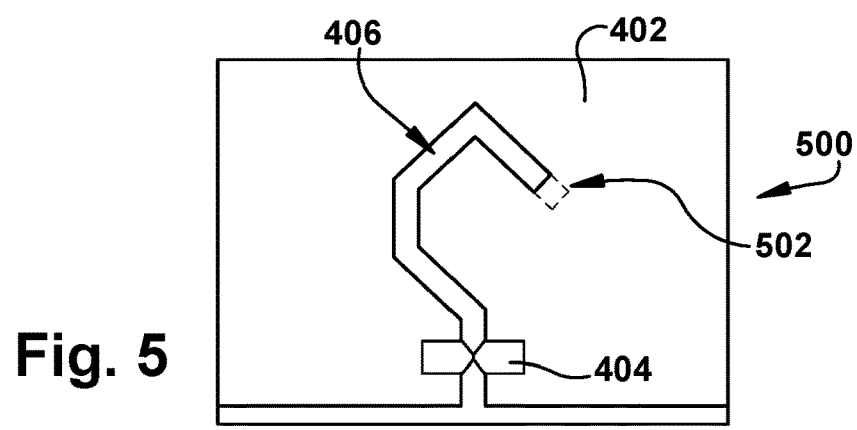
FIG. 5 depicts a repurposed RFID tag according to one embodiment.

Referring to FIG. 5, an embodiment of a repurposed RFID tag 500 is presented. The repurposed RFID tag 500 includes the portion of the conductor 402 and the RFID chip 404 from the damaged RFID tag 400 of FIG. 4. The slot 406 is reconfigured, for example by removing additional slot 502 as illustrated. In certain configurations, the additional slot 502 can be configured using the same means as the cut lines 410 and performed substantially at the same time. The additional slot 502 can change the performance and operational frequency for the desired application. For example, in one configuration the additional slot 502 can be configured to retune the RFID tag 500 for the original application. In another configuration, the additional slot 502 can tune the RFID tag 500 for a different application.

Referring to FIG. 6, a flowchart 600 of example operations for recovering an RFID tag from a label is presented. At block 602, a label that includes an RFID tag is recovered, for example as part of a recycling operation of RFID baggage tags at an airport or from a manufacturer. At block 604 the label is inspected for damage, for example by performing RF measurements. At block 606, if the RFID tag in the label is unusable for example due to excessive damage to the conductor, slot, or RFID chip, then the label and RFID tag is discarded or recycled at block 608.

If at block 608 the RFID tag in the label can be reused, then at block 610 cut lines are defined as described above for FIGS. 3, 4, and 5. Any suitable detection system for determining where to position the cut lines can be used, for example a metal detector system, an optical system based on passage of light through the label, low power or backscattering X-ray systems, or millimeter wave imaging among other suitable systems as would be understood in the art. At block 612 cuts into the label allow the RFID tag to be removed from the label and optionally retuned for a different application. At block 614, the RFID tag is reused, for example by putting the extracted RFID tag into a new label.

Referring to FIG. 7, a flowchart 700 of example operations for recovering an RFID tag from a damaged label is presented. At block 702, an image of the RFID tag is obtained, for example using a suitable vision system as describe above. At block 704 measurements of the usable physical structure of the conductor of the RFID tag are used to determine whether the RFID tag can be reconfigured for other applications, or the same application. At block 706, the suitable cuts are determined for one of the applications and at block 708 the cuts are made in the RFID tag. At block 710, the RFID tag is reused, for example by putting the reconfigured RFID into a new label.

Referring to FIG. 8, a flowchart 800 of example operations for reusing RFID tags are presented. At block 802, the RFID tag is used for the first time, for example as part of a first baggage label. At block 804, the RFID tag is recovered after the first use. At block 806, the RFID tag is cut from the label, for example as described above with regards to FIG. 6, 7, or 8. At block 808 the RFID tag is reused for the first time, for example by putting the RFID tag into a second baggage label. At block 810, the RFID tag is recovered a second time after the second use as a baggage tag. At block 812, a second set of cuts is performed to remove the RFID tag from the label a second time. At block 814, the RFID tag is reused for the second time, for example by putting the RFID tag into a third baggage label. Additional reuses can continue to be made so long as the RFID tag can continue to be suitably tuned for one or more applications as would be understood in the art.

Figure 9A:
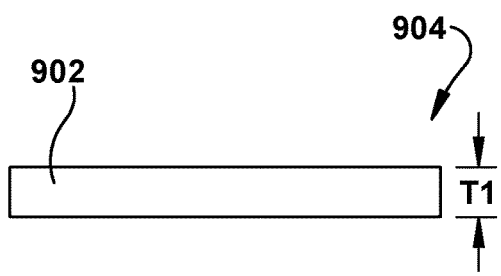
FIG. 9A depicts an example recovered RFID tag.

Referring to FIG. 9A, an embodiment of a recovered RFID tag 904 is presented. The thickness T1 of the RFID tag 902 can depend on the type of prior use and the number of prior uses. For example, an RFID tag 902 cut from a label having a single layer can have a different thickness than an RFID tag 902 cut from a label having two opposing layers. Similarly, with each additional reuse, the thickness T1 of the RFID tag 902 can increase. The thickness T1 of the RFID tag 902 can render the RFID tag 902 unsuitable for certain uses, for example if the thickness T1 would create a visual disturbance on the label or create a protrusion on the label that could make it difficult to print onto the label. In this event, the recovered RFID tag 904 can become unsuitable for the original use but still reusable for a different reuse.

Figure 9B:
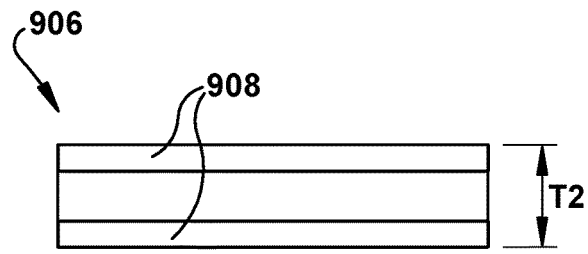
FIG. 9B depicts an example reuse of a recovered RFID tag.

Referring also to FIG. 9B, an embodiment of a reuse of a recovered RFID tag 906 is presented. In this embodiment, the RFID tag 902 can be reused in a different application where the thickness T2 is less critical. For example, positioning the RFID tag 902 between opposing layers of a carton 908 could render the thickness of the RFID tag 902 less critical.

Figure 10A:
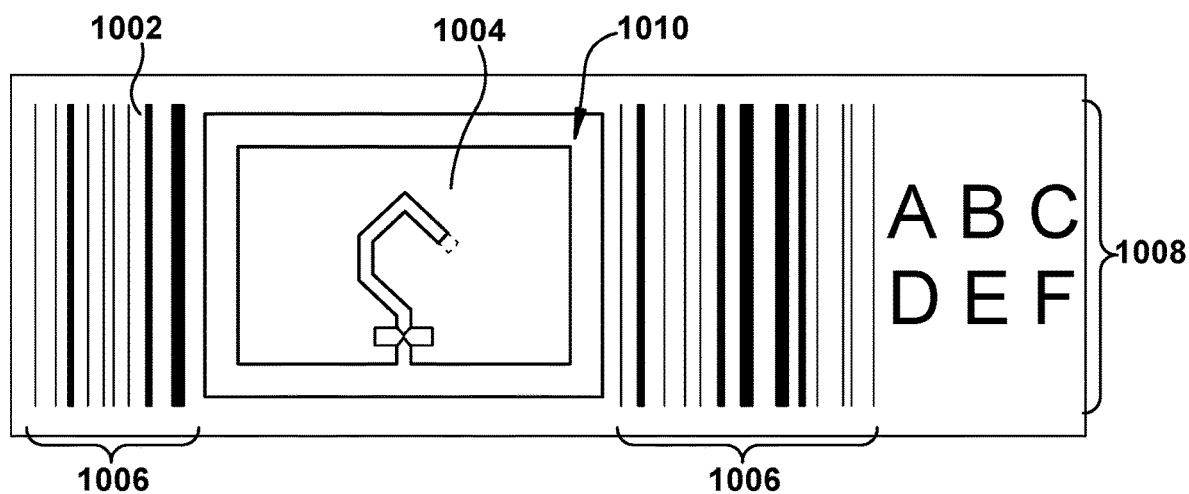
FIG. 10A depicts an embodiment of a baggage label configured for recovery of an RFID tag.
Figure 10B:
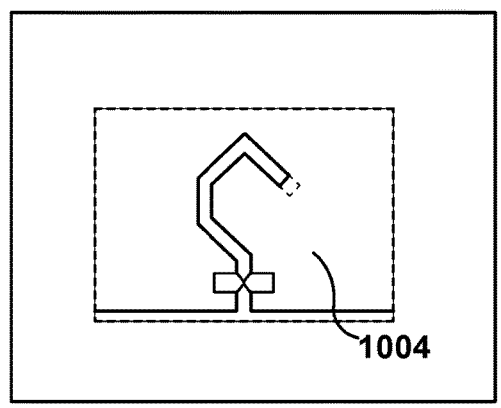
FIG. 10B depicts recovered RFID tag suitable for reuse.

Referring to FIG. 10A, an embodiment of a baggage label 1002 configured for recovery of an RFID tag 1004 is presented. As in FIG. 2, the baggage label 1002 can include human readable indicia 1008 and machine readable indicia such as barcodes 1006. However, the RFID tag 1004 is purposefully positioned in a whitespace area 1010 where there is no printing. Referring also to FIG. 10B, the RFID tag 1004 can be extracted from the baggage label 1002 without including any printing its previous use as a baggage label 1002. Advantageously, because the extracted RFID tag 1004 does not include printing from the previous use, the RFID tag 1004 can be reused in an application where there is printing over the RFID tag 1004.

The values disclosed herein are not to be understood as being strictly limited to the exact numerical values recited. Instead, unless otherwise specified, each such dimension is intended to mean both the recited value and a functionally equivalent range surrounding that value. It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A method of recovering and reusing a radio frequency identification ("RFID") tag associated with a damaged label, comprising:

determining, for the damaged label, an undamaged portion of a conductor antenna of the RFID tag;
    determining one or more cut lines to remove, from the damaged label, at least part of the RFID tag that includes at least a part of the conductor antenna from the undamaged portion of the conductor antenna;
    cutting the damaged label at the one or more cut lines to remove the part of the RFID tag; and
    placing the removed part of the RFID tag including the undamaged portion of the conductor antenna on a second label.

2. The method of claim 1, further comprising:

determining one or more application uses for the RFID tag based at least in part on the determination of the undamaged portion of the conductor antenna;
    selecting one of the application uses; and
    determining one or more cut lines to reconfigure the RFID tag for the selected application use.

3. The method of claim 1, wherein the RFID tag is a sloop type RFID tag comprising a conductor antenna that includes a slot disposed between opposing portions of the conductor antenna, and an RFID chip that is disposed across the slot and that is in electrical communication with the opposing portions of the conductor antenna.

4. The method of claim 2, further comprising:

determining one or more cut lines to reconfigure the slot of the RFID tag to tune the RFID tag for a different application use associated with the second label.

5. The method of claim 1, further comprising:

assessing damage to the RFID tag by performing RF measurements of the RFID tag.

6. The method of claim 1, wherein the cutting is performed using one or more of a knife cutter, a die cutter, or a laser cutter.

7. The method of claim 1, wherein determining the undamaged portion of the conductor antenna is performed by one or more of a metal detector system, an optical system based at least in part on passage of light through the first label, a low power X-ray system, or a millimeter wave imaging system.

8. A method of recovering and reusing a radio frequency identification ("RFID") tag associated with a damaged label, comprising:

determining, for a damaged label, an undamaged portion of a conductor antenna of the RFID tag;
    extracting the RFID tag from the damaged label by cutting along one or more cut lines formed around a perimeter of the RFID tag and isolating a damaged portion of the first damaged label; and
    placing the extracted RFID tag including the undamaged portion of the conductor antenna in a second label.

9. The method of claim 8, wherein extracting the RFID tag comprises cutting at least part of the conductor antenna of the RFID tag in the first label such that the conductor antenna of the extracted RFID tag is selected only from the undamaged portion of the conductor antenna.

10. The method of claim 9, further comprising:

determining one or more application uses for the RFID tag for the second label based at least in part on the determination of the undamaged portion of the conductor antenna; and
    selecting one of the application uses, and
    reconfiguring the RFID tag for the selected application use by appropriately cutting the conductor antenna.

11. The method of claim 8, wherein the RFID tag is a sloop type RFID tag comprising a conductor antenna that includes a slot disposed between opposing sides of the conductor antenna, and an RFID chip that is disposed across the slot and that is in electrical communication with the opposing sides of the conductor antenna.

12. A label, comprising:
a substrate;
a plurality of indicia printed on the substrate; and
at least a portion of a radio frequency identification ("RFID") tag removed from a damaged label and secured to the substrate, said at least a portion of the RFID tag comprising
an undamaged portion of a conductor antenna of the RFID tag;
a slot disposed between opposing sides of the conductor antenna, and
an RFID chip that is disposed across the slot and that is in electrical communication with the opposing sides of the conductor antenna.

13. The label of claim 12, wherein the conductor antenna of the portion of the RFID tag removed from the damaged label is configured to allow the label to be used for a different application than the damaged label.

14. The label of claim 12, wherein the slot is configured to allow the label to be used for a different application than the damaged label.

15. The label of claim 12, wherein the plurality of indicia include one or more of machine readable indicia or human readable indicia.

16. The label of claim 12, wherein the portion of the RFID tag removed from the damaged label includes part of the damaged label that is free of indicia.

17. The label of claim 12, wherein the label and the damaged label are baggage labels configured for use in the airline industry.

* * * * *